(12) United States Patent
Murakami et al.

(10) Patent No.: US 9,653,220 B2
(45) Date of Patent: May 16, 2017

(54) CAPACITOR

(71) Applicants: NGK SPARK PLUG CO., LTD., Nagoya-shi, Aichi (JP); ENERGY STORAGE MATERIALS LLC, Fujisawa-shi, Kanagawa (JP)

(72) Inventors: Kenji Murakami, Kani (JP); Motohiko Sato, Konan (JP); Hiroshi Yamamoto, Konan (JP); Jun Otsuka, Konan (JP); Takaaki Tsurumi, Fujisawa (JP)

(73) Assignees: NGK SPARK PLUG CO., LTD., Nagoya-shi, Aichi (JP); ENERGY STORAGE MATERIALS LLC, Fujisawa-shi, Kanagawa (JP)

( * ) Notice: Subject to any disclaimer, the term of this patent is extended or adjusted under 35 U.S.C. 154(b) by 6 days.

(21) Appl. No.: 14/775,391

(22) PCT Filed: Feb. 26, 2014

(86) PCT No.: PCT/JP2014/001019
§ 371 (c)(1),
(2) Date: Sep. 11, 2015

(87) PCT Pub. No.: WO2014/141603
PCT Pub. Date: Sep. 18, 2014

(65) Prior Publication Data
US 2016/0027591 A1 Jan. 28, 2016

(30) Foreign Application Priority Data
Mar. 15, 2013 (JP) .................... 2013-053720

(51) Int. Cl.
*H01G 11/56* (2013.01)
*H01G 11/06* (2013.01)
*H01G 9/15* (2006.01)

(52) U.S. Cl.
CPC ............. *H01G 11/56* (2013.01); *H01G 11/06* (2013.01); *H01G 9/15* (2013.01); *Y02E 60/13* (2013.01)

(58) Field of Classification Search
CPC .......... H01G 9/15; H01G 11/50; H01G 11/56; H01G 11/54
See application file for complete search history.

(56) References Cited

U.S. PATENT DOCUMENTS

| 2008/0117563 A1 | 5/2008 | Nagata et al. |
| 2012/0002348 A1* | 1/2012 | Momo .................. H01G 11/06 361/502 |

(Continued)

FOREIGN PATENT DOCUMENTS

| JP | 2008-130844 A | 6/2008 |
| JP | 2012-142268 A | 7/2012 |

(Continued)

OTHER PUBLICATIONS

Machine translation of JP 2012-142268.*

(Continued)

*Primary Examiner* — Dion R Ferguson
(74) *Attorney, Agent, or Firm* — Stites & Harbison, PLLC; Jeffrey A. Haeberlin; Rachel D. Rutledge

(57) ABSTRACT

To provide a capacitor capable of having a larger capacity than a case where only a solid electrolyte is simply used as a dielectric material of the capacitor. The capacitor (1) includes a solid electrolytic body (3) and a plurality of electrodes (5, 7) which is formed on the solid electrolytic body (3) and disposed opposite to each other with the solid electrolytic body (3) interposed therebetween, and the solid electrolytic body (3) includes an oxide-based lithium ion (Continued)

conductive solid electrolyte as a base material and contains oxide particles formed of a part of elements configuring the base material.

5 Claims, 1 Drawing Sheet

(56) References Cited

U.S. PATENT DOCUMENTS

| | | | | |
|---|---|---|---|---|
| 2013/0202971 A1* | 8/2013 | Zhao | ................. | H01M 10/0562 429/323 |
| 2014/0321030 A1 | 10/2014 | Tsurumi | | |
| 2015/0056519 A1* | 2/2015 | Ohta | ................. | H01M 10/0562 429/320 |

FOREIGN PATENT DOCUMENTS

| | | |
|---|---|---|
| JP | 2013-045738 A | 3/2013 |
| WO | 2012/080826 A1 | 6/2012 |
| WO | 2013/111804 A1 | 5/2015 |

OTHER PUBLICATIONS

Machine translation of JP 2013-045738.*
International Search Report in corresponding International Application No. PCT/JP2014/001019, dated Mar. 25, 2014.

* cited by examiner

CAPACITOR

TECHNICAL FIELD

The present invention relates to a capacitor which accumulates or releases charges, and specifically, a capacitor using an oxide-based lithium ion conductive solid electrolytic material.

BACKGROUND ART

Conventionally, capacitors using an electrolytic solution have been known as capacitors using an electrolytic material. However, other than this, techniques of electrical double layer capacitors which have a pair of electrodes provided on surfaces of a solid electrolytic body and use an inorganic solid electrolyte as a material of the solid electrolytic body have been proposed in recent years (see Patent Document 1).

Patent Document 1 discloses that a lithium (Li) ion conductive compound and a sodium (Na) ion conductive compound are contained as an inorganic solid electrolyte.

CITATION LIST

Patent Document

[Patent Document 1] JP-A-2008-130844

SUMMARY OF INVENTION

Technical Problem

Although the above-described conventional art solves the problem of leakage of the electrolytic solution, there is a problem in that an increase in capacity of the capacitor (large capacity) is not sufficiently considered.

That is, capacitors having a larger capacity (electrostatic capacity) have been required in recent years, but there is a problem in that the measure taken for that has been insufficient.

The invention is contrived to solve the above-described problems, and an object thereof is to provide a capacitor capable of having a larger capacity than a case where only a solid electrolyte is simply used.

Solution to Problem (1) According to a first aspect of the invention, there is provided a capacitor including: a solid electrolytic body; and a plurality of electrodes which is formed on the solid electrolytic body and disposed opposite to each other with the solid electrolytic body interposed therebetween, characterized in that: the solid electrolytic body includes an oxide-based lithium ion conductive solid electrolyte as a base material and contains oxide particles formed of a part of elements configuring the base material.

In the first aspect, since the solid electrolytic body of the capacitor includes an oxide-based lithium ion conductive solid electrolyte as a base material and contains oxide particles formed of a part of elements configuring the base material, the capacitor has a large capacity (electrostatic capacity) as is obvious from a test example to be described later.

Here, the base material is a main component (equal to or greater than 50 vol %) of the solid electrolytic body.

(2) A second aspect of the invention is characterized in that: the oxide particles have no ionic conductive property.

According to the study of the inventors, the above-described oxide particles have no ionic conductive property. That is, as is obvious from the test example to be described later, since such oxide particles are contained in the base material, the capacity of the capacitor is increased.

(3) A third aspect of the invention is characterized in that: a content of the oxide particles is 5 vol % to 33 vol % with respect to the solid electrolytic body.

As is obvious from the test example to be described later, when the content of the oxide particles is 5 vol % to 33 vol % with respect to the solid electrolytic body, the capacity can be further increased.

That is, when the content of the oxide particles is less than 5 vol %, the capacity improvement effect of the oxide particles is reduced, and when the content of the oxide particles exceeds 33 vol %, the capacity improvement effect is estimated to be reduced since the conduction path of lithium ions is blocked and the ionic conductivity of the entire solid electrolytic body is thus conversely reduced.

(4) A fourth aspect of the invention is characterized in that: an average particle diameter of the oxide particles is equal to or less than 1.1 μm and the content of the oxide particles is 5 vol % to 15 vol % with respect to the solid electrolytic body.

As is obvious from the test example to be described later, when the average particle diameter of the oxide particles is equal to or less than 1.1 μm and the content of the oxide particles is 5 vol % to 15 vol % with respect to the solid electrolytic body, the capacity can be further increased.

(5) A fifth aspect of the invention is characterized in that: he base material is a material which is expressed by a general formula: $Li_{1+x}M_xM'_{2-x}(PO_4)_3$ ($0 \leq x \leq 1$), where M is one or more of elements selected from Al, Ga and In, and M' is one or more of elements selected from Ti, Zr, Hf, Ge and Sn.

In the fifth aspect, a base material which is preferred for improving the capacity is exemplified.

(6) A sixth aspect of the invention is characterized in that: the oxide particles include P and Al.

As is obvious from the test example to be described later, when the oxide particles include P and Al, a large capacity can be realized.

Hereinafter, each configuration of the invention will be described.

Examples of the oxide-based lithium ion conductive solid electrolyte include materials having a NASICON structure, materials having a garnet structure, and materials having a perovskite structure. Among these, a material expressed by the above-described general formula "$Li_{1+x}M_xM'_{2-x}(PO_4)_3$ ($0 \leq x \leq 1$)" is preferred.

Specifically, as the base material expressed by this general formula, for example, $Li_{1.5}Al_{0.5}Ge_{1.5}(PO_4)_3$ including Li, Al and Ge is preferred. Other than this, $Li_{1.3}Al_{0.3}Ti_{1.7}(PO_4)_3$ including Li, Al and Ti, or the like can be used.

Examples of the oxide particles include $Al_2O_3$, $GeO_2$, $P_2O_5$, and $AlPO_4$, and among these, for example, $AlPO_4$ including P and Al is preferred.

DESCRIPTION OF EMBODIMENTS

Hereinafter, embodiments of the invention will be described.

EMBODIMENTS a) First, a configuration of a capacitor of this embodiment will be described.

Figure 1:
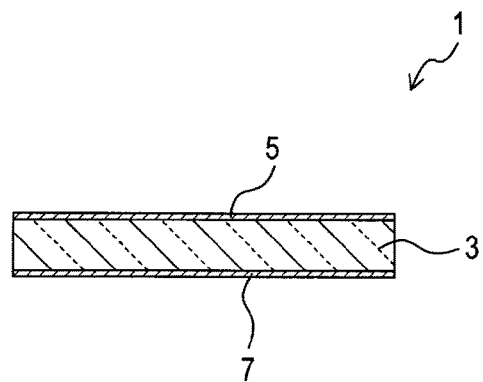
FIG. 1 is an explanatory diagram schematically showing a capacitor.

As shown in FIG. 1, a capacitor 1 of this embodiment has a plate-like (disc-like) solid electrolytic body 3 and a pair of electrodes 5 and 7 formed directly on both main surfaces (in the vertical direction in FIG. 1) of the solid electrolytic body 3.

Figure 2:
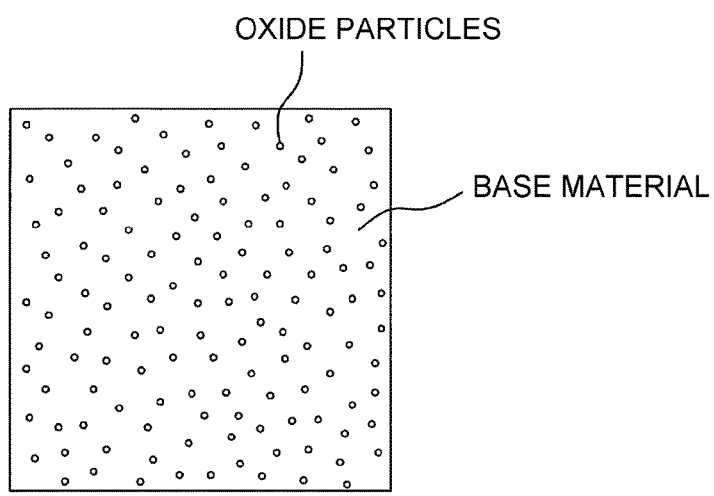
FIG. 2 is an explanatory diagram schematically showing an internal configuration of a solid electrolytic body.

In the solid electrolytic body 3, as schematically shown in FIG. 2, in a base material formed of an oxide-based lithium ion conductive solid electrolyte, oxide particles formed of apart of elements configuring the base material are uniformly dispersed.

Specifically, the base material is a material which is expressed by $Li_{1+x}M_xM'_{2-x}(PO_4)_3$ (0≤x≤1), where M is one or more of elements selected from Al, Ga and In, and M' is one or more of elements selected from Ti, Zr, Hf, Ge and Sn. Here, $Li_{1.5}Al_{0.5}Ge_{1.5}(PO_4)_3$ called LAGP is used as the base material.

As the oxide particles, aluminum phosphate ($AlPO_4$) including P and Al in oxide particles is used.

The average particle diameter of the oxide particles is equal to or less than 1.7 μm (preferably equal to or less than 1.1 μm). For example, it is 0.8 μm. In addition, the content of the oxide particles is, for example, 5.1 vol %, which is within the range of 3.7 vol % to 41 vol % (preferably 5 vol % to 33 vol % (more preferably 5 vol % to 15 vol %)) with respect to the solid electrolytic body 3.

The oxide particles have substantially no ionic conductive property so that an arc of a Cole-Cole plot cannot be confirmed or no resistance value can be read when measurement is performed based on an alternating current impedance method to be described later.

b) Next, a method of manufacturing the capacitor 1 of this embodiment will be described.

<Calcined LAGP Powder Producing Process>

Lithium carbonate, γ-alumina, germanium oxide, and diammonium hydrogen phosphate were weighed in predetermined amounts corresponding to a stoichiometric composition of LAGP and were mixed with an ethyl alcohol using a nylon pot and zirconia milling stone.

The mixture was dried, and then calcined by being held for 2 hours at a maximum temperature of 900° C. in an alumina crucible. Thus, a calcined LAGP powder was obtained.

<Calcined $AlPO_4$ Powder Producing Process>

γ-alumina and diammonium hydrogen phosphate were weighed in predetermined amounts and were mixed with an ethyl alcohol using a nylon pot and zirconia milling stone.

The mixture was dried, and then calcined by being held for 2 hours at a maximum temperature of 900° C. in an alumina crucible. Thus, a calcined $AlPO_4$ powder was obtained.

<Mixed Powder Producing Process>

The calcined LAGP powder and the calcined $AlPO_4$ powder obtained through the above-described processes were weighed at a predetermined ratio, were mixed and pulverized with an ethyl alcohol using a nylon pot and zirconia milling stone, and then were dried to obtain a mixed powder having a predetermined mixing ratio.

<Sintered Body Producing Process>

Next, the mixed powder was uniaxially pressed at a pressure of 5 MPa using a cylindrical mold of ϕ12 mm and hydrostatically pressed (CIP) at a pressure of 150 MPa to obtain a disc-like pellet.

Next, the obtained pellet was baked by being held for 12 hours at a maximum temperature of 850° C. under an air atmosphere to obtain the solid electrolytic body 3 which was a solid electrolyte sintered body of ϕ12 mm×thickness 1 mm.

<Electrode Forming Process>

Next, a pair of electrodes 5 and 7 was formed on surfaces of both of the main surfaces of the solid electrolytic body 3 by Au sputtering, and thus the capacitor 1 was completed.

c) The capacitor 1 of this embodiment obtained as described above has a large specific capacity, e.g., a DC capacity of 1500 [μF/cm$^2$] as is obvious from the test example to be described later, and is extremely excellent as the capacitor 1.

Test Example

Next, a test example for confirming the effects of the invention will be described.

In this test example, samples (Examples 1 to 7) of solid electrolytic bodies (which are sintered bodies) were produced as shown in the following Table 1 through the manufacturing method of the above-described embodiment, and characteristics of the materials and characteristics of the capacitors were examined as shown below.

Here, as shown in the following Table 1, Examples 1 to 7 are different from each other in terms of the amount of $AlPO_4$ added (accordingly, content), which is a raw material of oxide particles (calcined powder), and the particle diameter (that is, average particle diameter) of $AlPO_4$.

The particle diameter of $AlPO_4$ can be adjusted by adjusting the particle diameter of the calcined powder (furthermore, the particle diameter of the raw material of the calcined powder), a mixing time and the like. Specifically, the particle diameter of $AlPO_4$ can be reduced by reducing the particle diameter of the raw material and the like and lengthening the mixing time.

In Examples 1 to 7, the amount of $AlPO_4$ charged (added amount) is "0.0 wt % (Example 1)", "0.5 wt % (Example 2)", "5.0 wt % (Example 3)", "10.0 wt % (Example 4)", "20.0 wt % (Example 5)", "30.0 wt % (Example 6)", and "40.0 wt % (Example 7)", respectively.

<Measurement of Oxide Particle Distribution Amount>

A solid oxide body of each sample was cut, the cross-section thereof was polished, and SEM observation was performed with an SEM image. In the SEM image, the amount (vol %) and the particle diameter of oxide particles dispersed were measured through image analysis. The results thereof are recorded in the Table 1 shown below.

Specifically, an SEM image taken at a magnification of 3000 times was used for measurement of the particle diameter, and 500 or more oxide particles were measured. In addition, image analysis software was used for image analysis, and vol % was calculated from the area ratio of the oxide particles. In addition, the particle diameter (average particle diameter) was calculated from the maximum ferret diameter (the longest distance between two points of a particle) of the oxide particles.

<Measurement of Ionic Conductivity and Capacity>

A capacitor was made by forming electrodes on both surfaces of the solid oxide body of each sample by Au sputtering, and then the ionic conductivity and the capacity of the capacitor of each sample were measured by an AC impedance method. The results thereof are recorded in the Table 1 shown below.

Specifically, the AC impedance method was performed using an Agilent impedance analyzer 4294A with a measurement voltage of 100 [mV] at a measurement frequency of 40 [Hz] to 110 [MHz], and the conductivity [S/cm] was calculated from the resistance value obtained from the arc of a Cole-Cole plot and dimensions of the sample. In addition, the value of the capacity [μF] was calculated from the impedance value at 120 [Hz]. The results thereof are recorded in the Table 1 shown below.

The oxide particles were also subjected to the measurement of the ionic conductivity through the AC impedance method. However, the arc of a Cole-Cole plot could not be confirmed, so that the oxide particles substantially had no ionic conductive property.

<Measurement of DC Capacity>

The discharge capacity was measured through a DC potentiostatic method. The discharge capacity was measured using an ADC ultrahigh resistance/micro current meter R8340A and an Agilent digital multimeter 33410A with a charging time of 1 hour, a charging voltage of 2 [V], and a discharging time of 1 hour, and the specific capacity [μT/cm$^2$] was calculated from the discharge capacity and the sample area (area of one electrode). The results thereof are recorded in the Table 1 shown below.

TABLE 1

| | Content of AlPO$_4$ in Sintered Body [vol %] | Diameter of AlPO$_4$ Particles in Sintered Body [μm] | Conductivity (25° C.) [S/cm] | AC Capacity (120 Hz) [μF] | DC Capacity [μF/cm$^2$] |
|---|---|---|---|---|---|
| Example 1 | 3.7 | 1.5 | $2.5 \times 10^{-4}$ | 2.5 | 1500 |
| Example 2 | 5.1 | 0.8 | $5.1 \times 10^{-4}$ | 5.5 | 3000 |
| Example 3 | 9.4 | 1.0 | $4.5 \times 10^{-4}$ | 4.8 | 2800 |
| Example 4 | 14.1 | 1.1 | $4.1 \times 10^{-4}$ | 4.7 | 2600 |
| Example 5 | 22.5 | 1.5 | $3.7 \times 10^{-4}$ | 4.2 | 2300 |
| Example 6 | 33.0 | 1.6 | $3.3 \times 10^{-4}$ | 4.0 | 2200 |
| Example 7 | 41.0 | 1.7 | $2.9 \times 10^{-4}$ | 3.3 | 1800 |

Figure 3:
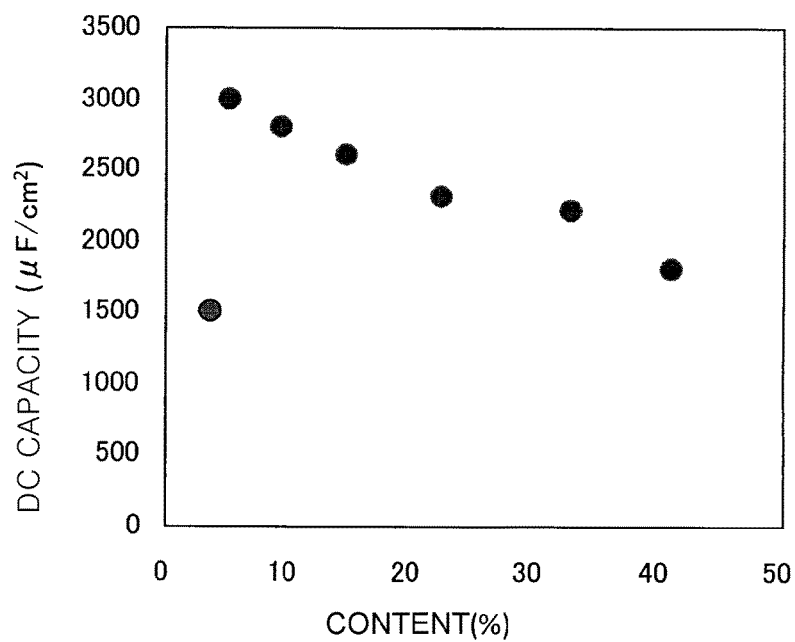
FIG. 3 is a graph showing the relationship between the content of oxide particles and an electrostatic capacity.

The following facts are obvious from Table 1 and FIG. 3 showing the data of Table 1 (the relationship between the content of AlPO$_4$ and the DC capacity) in a graph.

In Examples 1 to 7, the DC capacity is equal to or greater than 1500 [μF/cm$^2$] and this is significantly preferred.

In Examples 2 to 6, since the content of the oxide particles (AlPO$_4$ particles) in the solid oxide body is 5 vol % to 33 vol %, the DC capacity is equal to or greater than 2200 [μF/cm$^2$] and this is more significantly preferred.

In Examples 2 to 4, since the average particle diameter of the oxide particles in the solid oxide body is equal to or less than 1.1 and the content of the oxide particles in the solid oxide body is 5 vol % to 15 vol %, the DC capacity is equal to or greater than 2600 [μF/cm$^2$] and this is even more significantly preferred.

In Example 1, no oxide particles are added to the base material. However, oxide particles are thought to be precipitated from the base material according to the composition of the base material, the temperature condition upon baking and the like.

Needless to say, the invention is not limited to the above-described embodiments and examples, and can be implemented in various aspects without departing from the scope of the invention.

(1) For example, in the embodiments, calcined powders are respectively prepared in advance and are mixed, but as another method, a method of precipitating oxide particles upon calcination or baking by excessively adding components of the oxide particles (to be dispersed) than the stoichiometric composition of a base material when weighing the starting materials may be employed.

(2) The invention can be applied to, for example, solid batteries, carbon dioxide gas sensors, solid electric double layer capacitors, solid electrochemical elements, and the like.

(3) A material having lower ionic conductivity than the base material is considered to be used as the oxide particles.

That is, by adding, to the above-described base material, oxide particles having lower ionic conductivity (than the base material), the ionic conductivity of the entire solid electrolytic body is increased, and thus the capacity is thought to be increased.

The reason for this is estimated to be that by adding oxide particles having lower ionic conductivity (than the base material) to the base material, a space charge layer is generated in the solid electrolytic body by surface charges of particle interfaces, the defect concentration and the like near the interfaces are modulated, and thus the ionic conductivity of the solid electrolytic body is improved. As a result, the capacity of the capacitor is thought to be improved.

REFERENCE SIGNS LIST

1: capacitor
3: solid electrolytic body
5, 7: electrode

What is claimed is:

1. A capacitor comprising:
a solid electrolytic body; and
a plurality of electrodes which is formed on the solid electrolytic body and disposed opposite to each other with the solid electrolytic body interposed therebetween,
characterized in that:
the solid electrolytic body includes an oxide-based lithium ion conductive solid electrolyte as a base material and contains oxide particles formed of a part of elements configuring the base material; and a content of the oxide particles is 5 vol % to 33 vol % with respect to the solid electrolytic body.

2. The capacitor according to claim 1,
characterized in that:
the oxide particles have no ionic conductive property.

3. The capacitor according to claim 1,
characterized in that:
an average particle diameter of the oxide particles is equal to or less than 1.1 μm and the content of the oxide particles is 5 vol % to 15 vol % with respect to the solid electrolytic body.

4. The capacitor according to claim 1,
characterized in that:
the base material is a material which is expressed by a general formula:
$Li_{1+x}M_xM'_{2-x}(PO_4)_3$ (0≤x≤1), where M is one or more of elements selected from Al, Ga and In, and M' is one or more of elements selected from Ti, Zr, Hf, Ge and Sn.

5. The capacitor according to claim 1, characterized in that:
the oxide particles include P and Al.

* * * * *